United States Patent [19]
Obenreder

[11] 3,857,637
[45] Dec. 31, 1974

[54] SURFACE DISTORTION ANALYZER

[75] Inventor: Robert J. Obenreder, Coraopolis, Pa.

[73] Assignee: PPG Industries, Inc., Pittsburgh, Pa.

[22] Filed: Jan. 10, 1973

[21] Appl. No.: 322,574

[52] U.S. Cl.................. 356/120, 356/209, 356/237
[51] Int. Cl. ........................................... G01n 21/32
[58] Field of Search......... 356/120, 237; 350/276 R; 250/237

[56] References Cited
UNITED STATES PATENTS

| | | | |
|---|---|---|---|
| 2,215,211 | 9/1940 | Devol............................. | 250/237 X |
| 3,039,349 | 6/1962 | Rodgers......................... | 350/276 R |
| 3,639,112 | 2/1972 | Poola............................. | 356/120 X |
| 3,667,846 | 6/1972 | Nater et al...................... | 356/120 |
| 3,700,903 | 10/1972 | Adler et al..................... | 356/120 X |

Primary Examiner—John K. Corbin
Assistant Examiner—Matthew W. Koren
Attorney, Agent, or Firm—Donald Carl Lepiane

[57] ABSTRACT

A method of and apparatus for determining surface distortion, e.g. surface flatness, of a piece of glass as a function of position on the glass surface are disclosed. The piece of glass is displaced at a constant speed along a predetermined path relative to a light source, e.g. a continuous laser, and a position sensing photo detector. The laser and detector are in spaced relationship to each other and to a first surface of the piece of glass such that a laser beam directed to the first surface is reflected back therefrom onto the detector surface. Concave and convex portions in the surface displace the reflected beam along the detector surface. Electrical components operate on electrical signals from the detector to produce a surface flatness profile showing the nature of the surface curvature, i.e., concave or convex, and the amplitude of the curvature.

4 Claims, 5 Drawing Figures

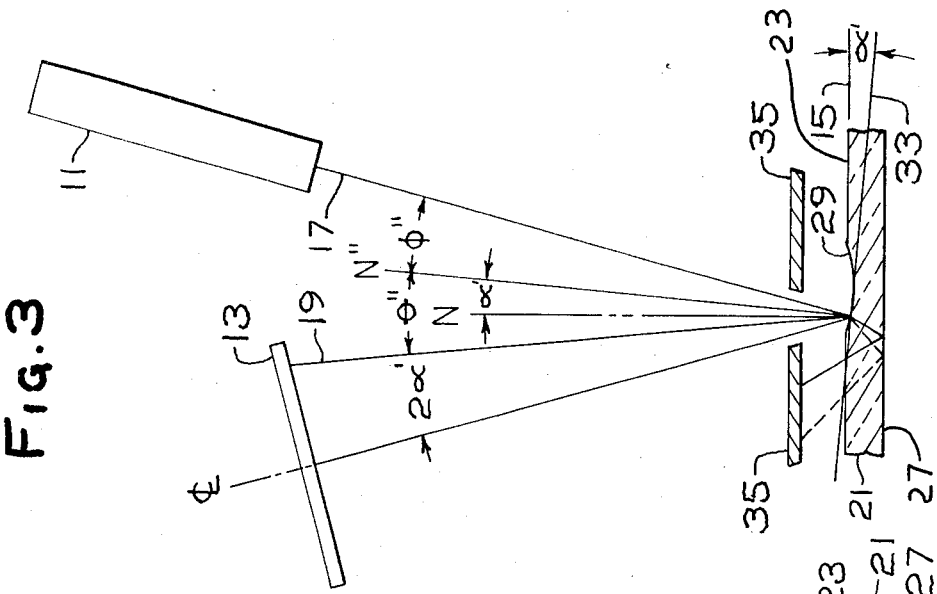
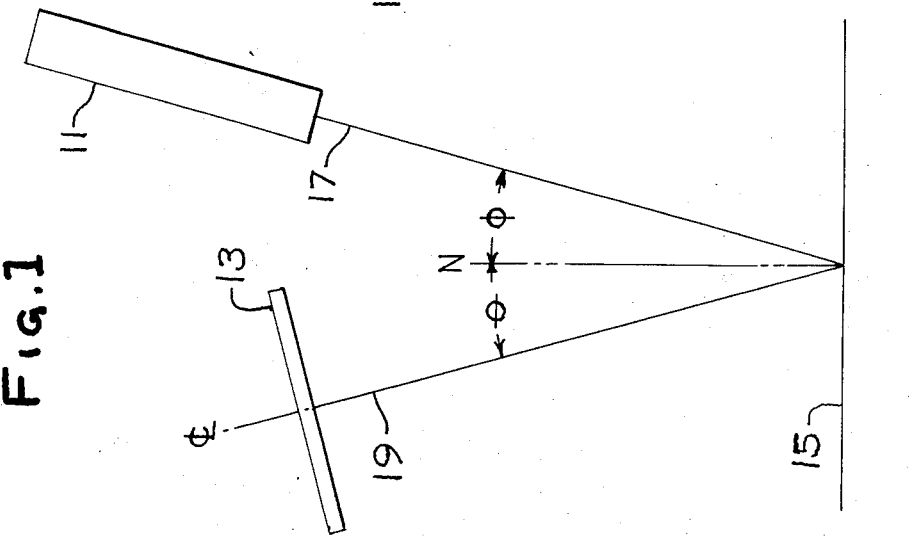

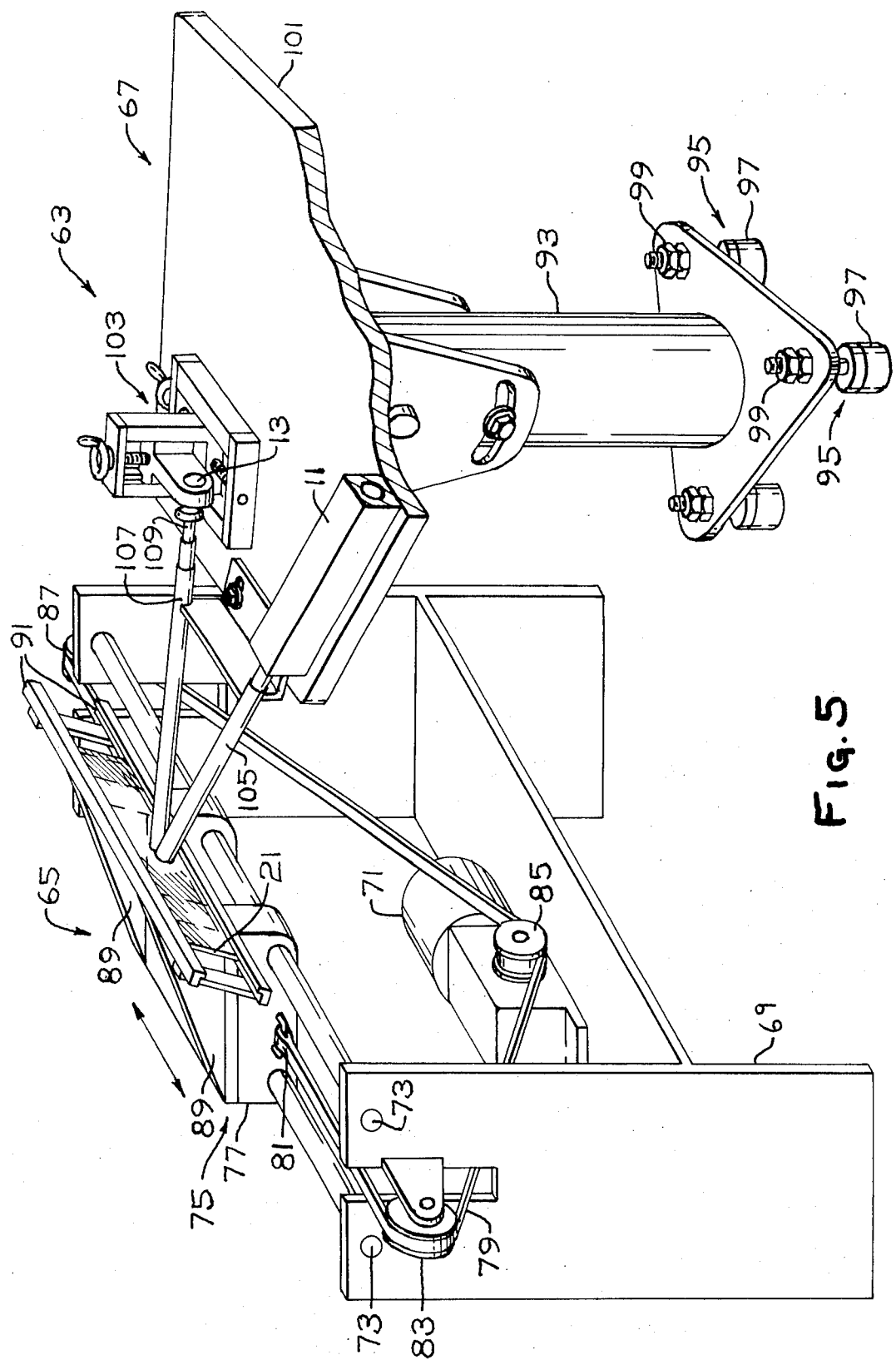

SURFACE DISTORTION ANALYZER

BACKGROUND OF THE INVENTION

1. Field of the Invention

This invention relates to a method of and apparatus for determining the surface flatness of a piece of glass as a function of position on the glass piece.

2. Description of the Prior Art

In methods of making glass by the known float process, plate process or sheet process, and in methods of shaping pieces of glass, defects may be produced in the glass which render the glass optically imperfect. Among the optical imperfections that may be produced is surface distortion. Surface distortion, as the term is used herein, generally refers to variations in surface flatness, i.e., concave and convex portions.

As is well known, surface distortion in glass reflects a distorted image. For example, convex portions shrink the image and concave portions magnify the image. When excessive distortion is present, the distorted images detract from the architectural beauty and are therefore not desirable.

U.S. Pat. No. 3,427,209 discloses a reflection apparatus for detecting pits in sheet material, e.g. a glass ribbon. In general, successive contiguous strip-shaped zones are illuminated on a ground surface of a glass ribbon. The light reflected from the surface forms an image of the illuminated zone of the surface. The reflected light operates on facilities to produce an electrical signal indicative of the presence and size of any detected pit. The signal is analyzed to obtain an indication of the distribution of pits across the surface.

Although the apparatus is acceptable for detecting pits, i.e. concave portions in the ground surface, there are no provisions for detecting convex portions in the surface. Further, there is no provision for determining the amplitude of convex or concave portions in the surface.

U.S. Pat. No. 3,355,980 similarly discloses an inspection apparatus. In general, a beam of radiant energy which is polarized so that it has an electric vector perpendicular to the plane of incidence is directed downwardly on the top surface of a container. The top surface is scanned by the beam of radiant energy. A line-over-finish defect, e.g. a concave portion in the top surface, will reflect the light upwardly into the line of vision of a radiant energy sensitive device which energizes a reject mechanism.

Although the apparatus is acceptable as an inspection device, it is not capable of determining the nature of surface curvature of the top surface, i.e., concave or convex portions in the top surface, and the amplitude of the curvature.

Surface deviation from flatness of a glass ribbon may also be determined on a sampling basis by selectively cutting a section from the glass ribbon. Surface deviation of the section of glass is measured using an interferometer. However, interferometers have distinct disadvantages. They are: (1) the flat which supports the glass to be inspected has to be normal to monochromatic light, (2) the readings can vary depending on positioning of the glass on a glass flat, or (3) the readings give contours in specific areas but do not readily give the relationship of the contours from one position to the other.

It would be advantageous if surface deviation from flatness in a section of glass selectively cut from a glass ribbon could be measured (1) as a function of position on the piece of glass, and (2) without the problems normally associated with interferometers.

SUMMARY OF THE INVENTION

This invention relates to a method of determining deviation in a specular surface from a reference plane. The specular surface is positioned relative to the reference plane and thereafter a beam of light is directed onto the specular surface. Relative motion is provided between the specular surface and the beam of light to reflect the beam of light from the surface along a scan path. The relative positions of the reflected beam of light are observed to determine deviations from flatness, i.e., convex and concave portions, in the specular surface.

This invention also relates to an apparatus for determining contours in a surface of an article having a specular surface. Facilities are provided for conveying the article along a predetermined path relative to a light source. Facilities are provided for mounting the light source relative to the predetermined path to direct a beam of light along a path at an oblique angle to a line normal to the predetermined path so as to reflect a beam of light away from the surface. Facilities are provided for sensing the relative positions of the reflected beam from the specular surface as the article is conveyed along the predetermined path. As can be appreciated, the light source may be displaced relative to the article or the article and light source may be moved relative to each other. By observing the positions of the reflected beam relative to a reference point on the sensing facilities, contours, i.e., concave and convex portions in the specular surface, are determined.

As can be appreciated, directing a beam of light from a stationary light source onto a specular surface, e.g. a reference plane, a reflected beam from the surface has an angle of reflection equal to the angle of incidence. If the reference plane is rotated clockwise toward the light source, the angle of incidence and angle of reflection decrease but remain equal to each other. The angle of reflection decreases by an amount equal to two times the rotational angle. Conversely, if the reference plane is rotated counterclockwise away from the light source, the angle of reflection increases by an amount equal to two times the rotational angle. By observing the relative positions of the reflected beam, surface deviations, i.e., concave and convex portions across a span, can be determined. Further, if the specular surface is displaced at a known constant speed, the flatness of the specular surface can be determined as a function of position on the specular surface.

BRIEF DESCRIPTION OF THE DRAWINGS

FIGS. 1, 2 and 3 are diagrammatic views showing the concept of the method of the invention.

FIG. 5 is an isometric view of an apparatus for practicing the method of this invention having portions cut away for clarity of illustration.

DESCRIPTION OF THE INVENTION

Figure 4:
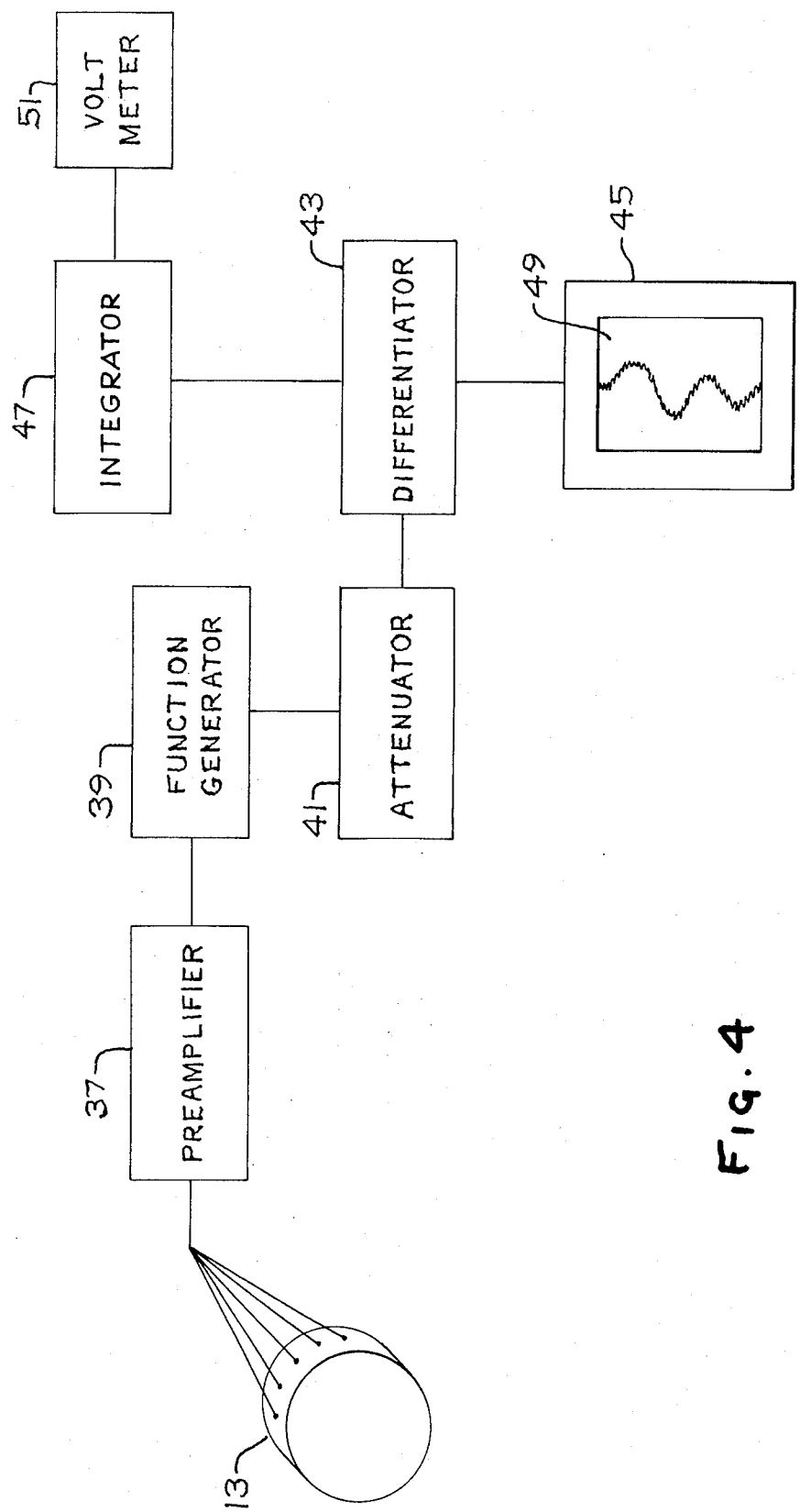
FIG. 4 is a block diagram of electronic equipment which operates on a signal from a position sensing photo detector to record flatness as a function of position on a glass surface and to record total area deviation from a zero reference line.

Shown in FIGS. 1, 2 and 3 are diagrammatic views illustrating the general concept of the method of this invention. Referring specifically to FIG. 1, there is shown a stationary light source 11, e.g., a continuous laser or a tungsten halogen filament lamp, having lenses to focus a beam of light, and a position sensing photo detector 13, each spaced a predetermined distance from each other and from a reference plane 15. The light source 11 directs a beam 17 having an angle of incidence $\phi$ of between 0° and 45°, and preferably 0° to 30°, onto the plane 15. An article having a specular surface in the plane 15 would reflect a beam 19 having an angle of reflection $\theta$ equal to the angle of incidence $\phi$ from the surface onto the surface of the detector 13. The selection of an angle of incidence between 0°–45° will readily become apparent.

Referring now to FIG. 2, there is shown a piece of glass 21, i.e., a section cut from a glass ribbon, having a top surface 23 in the reference plane 15. As will be appreciated, a light-absorbing material 25, e.g. black paint, is in optical contact with the bottom surface 27 of the glass 21 to prevent any reflection of the laser beam from the surface 27.

The glass 21, for purposes of illustrating the method of this invention, has a concave portion 29 on the top surface 23. Displacing the glass from left to right, as viewed in FIG. 2, moves the concave portion 29 past the laser beam 17. The laser beam is first incident on a wall of the concave portion sloped downward from right to left, as viewed in FIG. 2. A plane 31 is tangent to the point of impingement of the laser beam on the sloping wall of the concave portion 29. The plane 31 is rotated counterclockwise, as viewed in FIG. 2, by an angle $\alpha$ from the plane 15. Maintaining the light source stationary, the angle of incidence becomes $\phi'$ which is larger than $\phi$ (see FIG. 1) by an amount equal to the angle $\alpha$. The angle of reflection $\theta'$ remains equal to the angle of incidence. The total increase between the reflected beam 19 and normal N to reference plane 15, as viewed in FIG. 1, is increased by an angle $2\alpha$ (see FIG. 2). The reflected beam 19 now strikes the detector surface to the left of the center line as viewed in FIG. 2.

By maintaining the angle of incidence $\phi$ (see FIG. 1) 45° or less, surface displacement, e.g. displacement of the surface above or below the reference plane 15 in the microinch range, becomes insignificant to the angular rotation effect of the reference plane. As is well known by those skilled in the art, short term variations in thickness of float or plate glass is normally in the microinch range. Therefore, deviations of the top surface 23 of the piece of glass 21 from the reference plane 15 (see FIG. 1) caused by variations in thickness are insignificant relative to the angular rotation of the reference plane.

Referring now to FIG. 3, there is shown (1) the effect when the beam 17 is incident to a surface sloping from left to right, as viewed in FIG. 3, and (2) another method of cancelling the reflection from the bottom surface 27.

As the beam 17 is incident on the surface of the concave portion 29 sloping downward from the left to right, as viewed in FIG. 3, a plane 33 is tangent to the surface at the point of incident and rotated clockwise from the reference plane 15 by an angle $\alpha'$. In this instance, the angle of incidence $\phi''$ decreases by an amount equal to the angle $\alpha'$. The total decrease between the reflected beam 19 and the normal N to the reference plane 15, is $2\alpha'$.

The reflected beam 19 now strikes the detector surface to the right of the center line.

By observing the position of the reflected beam 19 on the surface of the detector 13 and moving the glass 21 at a constant speed, a flatness profile of the top surface 23 of the glass 21 can be made as a function of position on the glass ribbon.

Consider now another method of cancelling the reflected beam from the bottom surface 27. As is well known by those skilled in the art, a beam of light striking a piece of glass is partially (1) reflected from the top surface, (2) from the opposite surface thereto, and (3) passed through the glass. The distance between the reflected beam from opposed surfaces 23 and 27 depends on the angle of incidence, the index of refraction of the glass, and the glass thickness. Advantageously focusing the beam of light onto the top surface 23 as by a lens (not shown), the reflected beam of light strikes the top surface at a point. The beam of light striking the bottom surface is partially reflected from the bottom surface 27 as a secondary beam (see FIG. 3). Positioning an opaque member or shield 35 such as a metal washer adjacent the top surface 23 of the glass 21, the beams 17 and 19 pass through the center of the washer while the surface of the detector 13 is shielded from the reflected beams from the bottom surface 27 of the glass ribbon.

As can be appreciated, the thicker the piece of glass, the greater the distance between the reflected beam from the top and bottom surfaces. By increasing the distance therebetween, the shielding of the secondary beam from the bottom surface is facilitated. For pieces of glass having a thickness of less than 3/16 inch and using an angle of incidence of 15°, it is recommended that a light-absorbing coating be used; for thickness of greater than 3/16 inch, a shield can efficiently be used. For thicknesses of less than 3/32 inch and an angle of incidence of 30°, a light-absorbing coating is recommended; for thicknesses of greater than 3/32 inch, a shield may efficiently be used.

As can be appreciated by those skilled in the art, the discussion has been directed to a section selectively cut from a glass ribbon; however, the surface flatness or surface contour of any article having a specular surface may be determined using the method of this invention.

Referring to FIG. 4, there is shown a block diagram of electronic components that may be used to convert the signal from the position sensing photo detector 13 to (1) give a flatness profile of the glass ribbon, or (2) give overall deviation caused by concave and convex portions in the top surface 23 (see FIGS. 2 and 3) from a zero reference, e.g. the reference plane. In general, the signal from the photo detector 13 is too weak for linearization in a function generator and is therefore forwarded to a preamplifier 37 for amplification. The signal received from the position sensing photo detector indicates the position of the reflected beam on the surface of the detector, i.e., voltage output as a function of position of the reflected beam on the detector surface. The amplified signal is thereafter forwarded to a function generator 39 which operates on the amplified input signal to linearize the position/voltage relationship of the amplified detector signal. The amplified linearized output signal from the function generator is forwarded to an attenuator 41 which reduces the amplified linearized signal. The reduced signal from the attenuator is then forwarded to a differentiator 43 which differentiates the signal with respect to time, more particularly, rate of change of voltage with respect to time. Since the ribbon is moving at a constant speed, time can be related to displacement of the ribbon relative to the point of incidence of the laser beam on the top surface. The output signal from the differentiator 43 is either forwarded to an X-Y voltage recorder 45 or to an integrator 47 or both.

The X-Y recorder plots a flatness profile on a chart 49, i.e., direction and amount of deviation of the top surface flatness of the ribbon relative to the reference plane 15 (see FIG. 1). Plotting the flatness profile on the chart 49 while moving the glass ribbon at a constant speed, deviations from flatness of the top surface caused by concave and convex portions on the top surface as a function of position of the glass ribbon are determined. The integrator 47 integrates the voltage to give a voltage indicative of overall deviation of the surface flatness from a zero reference, i.e., the reference plane. The voltage is displayed on a volt meter 51.

As can be appreciated by those skilled in the art, the electrical components and their operating relationship to one another is only illustrative of one of many that may be used. Other circuitry and components, e.g. a computer, may be used without deviating from the scope of the invention.

Referring once again to FIG. 4, and more specifically to the chart 49, the chart 49 plots a flatness profile of the surface 23 of the glass 21 (see FIGS. 2 and 3) by showing concave and convex portions across a span as well as their amplitude. As can be appreciated, deviation may be shown as a sinuous curve with convex portions indicated by the first half cycle of a sine wave and concave portions indicated by the second half of the sine wave.

APPARATUS

In FIG. 5, there is shown an apparatus 63 that may be used to practice the method of this invention. As will be appreciated by those skilled in the art, the apparatus is only illustrative of one type that may be used and other apparatuses may be used equally well to practice the method of this invention.

The apparatus 63 has a conveyor 65 for displacing the glass 21 relative to a light emitting and receiving station 67. The conveyor 65 has a base 69 on which is mounted a motor 71 and a pair of guide rails 73. A workholder 75 has a base 77 mounted on the guide rails 73 for reciprocal movement relative to the light emitting and receiving station 67 by way of a belt or cable 79. The cable has one end connected to the base 77 of the workholder 75 at 81 and has its course about an idle wheel 83, a drive pulley 85 which is connected to and driven by the motor 71 and about a second idle pulley 87 with the other end of the cable connected to the workholder base 77 as at 81. The motor 71 rotates the drive pulley 85 to displace the workholder 75 either from left to right or right to left as shown in FIG. 5 at a constant speed.

A pair of struts 89 are mounted on the workholder base 77 and support a pair of L-shaped members 91 in spaced relationship to each other and slightly tilted, e.g. about 6°, toward the station 67, as shown in FIG. 5, to give positioning stability to and prevent deformation of the glass ribbon under its own weight. The glass 21 is positioned between the members 91 as shown in FIG. 5 and maintained against the members by gravity. In this manner, the contour of the glass is not acted on by external forces which could distort the intrinsic shape of the glass.

The light emitting and receiving station 67 has a base 93 on mounts 95. The mounts 95 include vibration pads 97 to prevent vibrations in the surrounding area from being transmitted to the laser 11 and photo detector 13 and facilities 99 to permit adjustment of the base relative to the conveyor 65. The laser 11 and detector 13 are mounted on a pivotable platform 101, as shown in FIG. 5, in spaced, predetermined relationship to each other and to the glass such that a laser beam reflected from the top surface 23 of the glass 21 is incident onto the detector surface (see FIGS. 2 and 3). The platform 101 is pivotally mounted relative to the glass 21 to maintain the laser beam and detector in a plane perpendicular to the plane of the glass, e.g. the reference plane 15 (see FIG. 1).

The detector 13 is mounted in an X-Y holder 103 to permit alignment of the detector surface with the reflected beam to assure that the reflected beam remains on the detector surface throughout the scan. The position of the reflected beam from the leading edge of the glass ribbon is the voltage reference position. Deviations in flatness of the top surface caused by concave and convex portions are measured in terms of voltage variations.

Positioned about the laser beam and the reflected beam 17 and 19, respectively, (see FIGS. 2 and 3) is a tube 105 and a return tube 107 which are used to prevent air currents from disturbing the laser beam and the reflected beam, respectively. A movable light shield 109 is advantageously provided on the return tube 107 so that the detector may be visually positioned with respect to the reflected beam. The shield is normally closed to prevent strong room light from striking the detector and cancelling the effect of the reflected beam on the detector surface.

As previously discussed, the glass ribbon may have a coating of light-absorbent material 25 in optical contact with the bottom surface 27 to prevent reflection from the bottom surface or, in the alternative, an opaque member 35 such as a metal washer may be positioned adjacent the top surface (see FIGS. 2 and 3). In the instance where the washer is used, it would be advantageously positioned in the return tube 107 to shield the detector surface from the beam reflected from the bottom surface of the glass.

As can be appreciated by those skilled in the art, the discussion has been directed to scanning a piece of glass selectively cut from a glass ribbon. The scan path is from end to end; however, the scan path is not limited thereto and may be from side to side. Also, the discussion was directed to moving the glass relative to the laser beam. As can be appreciated by those skilled in the art, the laser beam may be displaced relative to the glass or, in the alternative, both the laser beam and the glass may be simultaneously displaced.

DETAILED DESCRIPTION

Referring to FIG. 5, a piece of glass 21, 24 inches in length and 4 inches in width, selectively cut from a glass ribbon of float glass ¼ inch thick is mounted in a workholder 75 between members 91 to tilt the glass at a 6° angle toward a light emitting and receiving station 67. Platform 101 of the station 67 is aligned with the glass to maintain a laser 11 and a position sensing photo detector 13 in a plane perpendicular to the plane of the glass 21 so as to read flatness of the glass from end to end along a center line. As can be appreciated, scanning the center of the glass is arbitrary and used for illustrative purposes only. The leading edge of the piece of glass is moved to the left, as viewed in FIG. 5, so that a laser beam from a 5 milliwatt helium neon laser 11 such as a Model 120 manufactured by Spectra-Physics strikes the leading edge of the top surface 23 and is reflected back to the position sensing photo detector 13 (see FIGS. 2 and 3). The detector may be a Model PIN-SC/10, manufactured by United Detector Technology. The end of the laser adjacent the top surface and photo detector is positioned 22 inches away from the workholder and the laser forms an angle of incidence of about 15°. An opaque member (not shown) is positioned in a return tube 107 to shield the detector surface from the reflected beam from the bottom surface 27 (see FIG. 3). The light shield 109 is moved away from the photo detector surface and the X-Y holder 103 is adjusted so that the reflected beam will impinge on the center of the photo detector surface as shown in FIG. 1. The motor 71 is energized to displace the workholder 75 and glass ribbon relative to the laser beam at a constant speed of 60 inches per minute.

Referring now to FIG. 4, as the glass is displaced, the reflected beam strikes the surface of the photo detector 13 and a signal is forwarded to a preamplifier 37 such as Model 3061/16 manufactured by Burr Brown Instrumentation. The signal from the photo detector 13 is amplified for subsequent linearization in a function generator 39 such as Model 1662/16-2, manufactured by Burr Brown Instrumentation. The linearized position voltage from the function generator 39 is forwarded to an attenuator 41 having a pair of resistors to divide the voltage by a factor of 25. The attenuated signal is thereafter forwarded to a differentiator 43 constructed around an operational amplifier such as a Philbrick Model USA 3-M3 which differentiates the signal with respect to time, more particularly, rate of change of voltage which indicates rate of change of position of the reflected beam on the detector surface. The output signal from the differentiator 43 is either forwarded to an X-Y voltage recorder 45 or to an integrator 47 or both.

The X-Y recorder, such as a Hewlett-Packard Moseley Model 2DR-2 plots a flatness profile on a chart 49, i.e., direction and amount of deviation from flatness of the top surface from the zero reference. Moving the glass at a constant speed, deviation from flatness of the top surface as a function of position on the glass surface may be determined. The convex portions and concave portions are shown as sinuous curves with convex portions indicated by the first half cycle of a sine wave and concave portions indicated by the second half cycle of the sine wave.

The integrator 47 constructed around an operational amplifier such as a Philbrick Model USA 3-M3 integrates the voltage to give voltage indicative of the overall deviation of the flatness resulting from concave or convex portions from a zero reference, i.e., the reference plane. The voltage is displayed on a volt meter 51.

As can be appreciated, by practicing the method and using the apparatus of the invention, it is now possible to construct a flatness profile of an article having a specular surface as a relationship of position on the specular surface.

What is claimed is:

1. A method of sensing concave and convex portions in a surface of a piece of glass, comprising the steps of:
   directing a beam of light from a light source toward the surface of the piece of glass at an oblique angle of incidence to reflect a portion of the beam of light from the surface toward position sensing means as a reflected beam of light and passing the remaining portion of the beam of light through the surface as a transmitted beam of light wherein the angle of incidence is selected to minimize the effect of the glass movement toward and away from the position sensing means on the reflected beam;
   preventing the transmitted beam of light from impinging on the position sensing means;
   displacing the piece of glass and the beam of light relative to one another at a preselected constant speed to scan the surface of the piece of glass along a scan path;
   observing relative positions of the reflected beam of light with the position sensing means as the beam of light moves along the scan path to sense concave and convex portions in the surface of the piece of glass along the scan path wherein the relative positions of the reflected beam of light are observed as a function of time; and
   computing a flatness profile of the surface of the piece of glass (1) to determine if the curvature of the surface of the piece of glass along the scan path is concave or convex and (2) to determine the reflected optical power of the glass at each point along the scan path wherein the reflected optical power is proportioned to the magnitude of the local curvature of the surface at each point along the scan path.

2. The method as set forth in claim 1 wherein the oblique angle of incidence is between 0° and 45°.

3. An apparatus for sensing concave and convex portions in a surface of a piece of glass, comprising:
   a light source;
   a position sensing means;
   means for mounting said light source to direct a beam of light toward the surface of the piece of glass at an oblique angle of incidence to reflect a beam of light from the surface of the piece of glass toward said positioning sensing means as a reflected beam of light and passing the remaining portion through the surface as a transmitted beam of light wherein the angle of incidence is selected to minimize the effect of article movement toward and away from said position sensing means on the reflected beam;
   means for preventing the transmitted beam of light from impinging on said position sensing means;
   means for imparting relative motion between said light source and the piece of glass at a predetermined constant speed to scan the surface of the piece of glass along a scan path;
   means responsive to said position sensing means for determining relative positions of the reflected beam of light from the surface of the piece of glass as a function of time; and
   means responsive to said determining means for computing a flatness profile of the surface of the piece of glass (1) to determine if the curvature in the surface of the piece of glass is concave or convex and (2) to determine the reflected optical power of the glass at each point along the scan path wherein the reflected optical power is proportional to the magnitude of the local curvature of the surface at each point along the scan path.

4. The apparatus as set forth in claim 3 wherein said mounting means directs the beam of light at an oblique angle of incidence between 0° and 45°.

* * * * *